Figure 1:
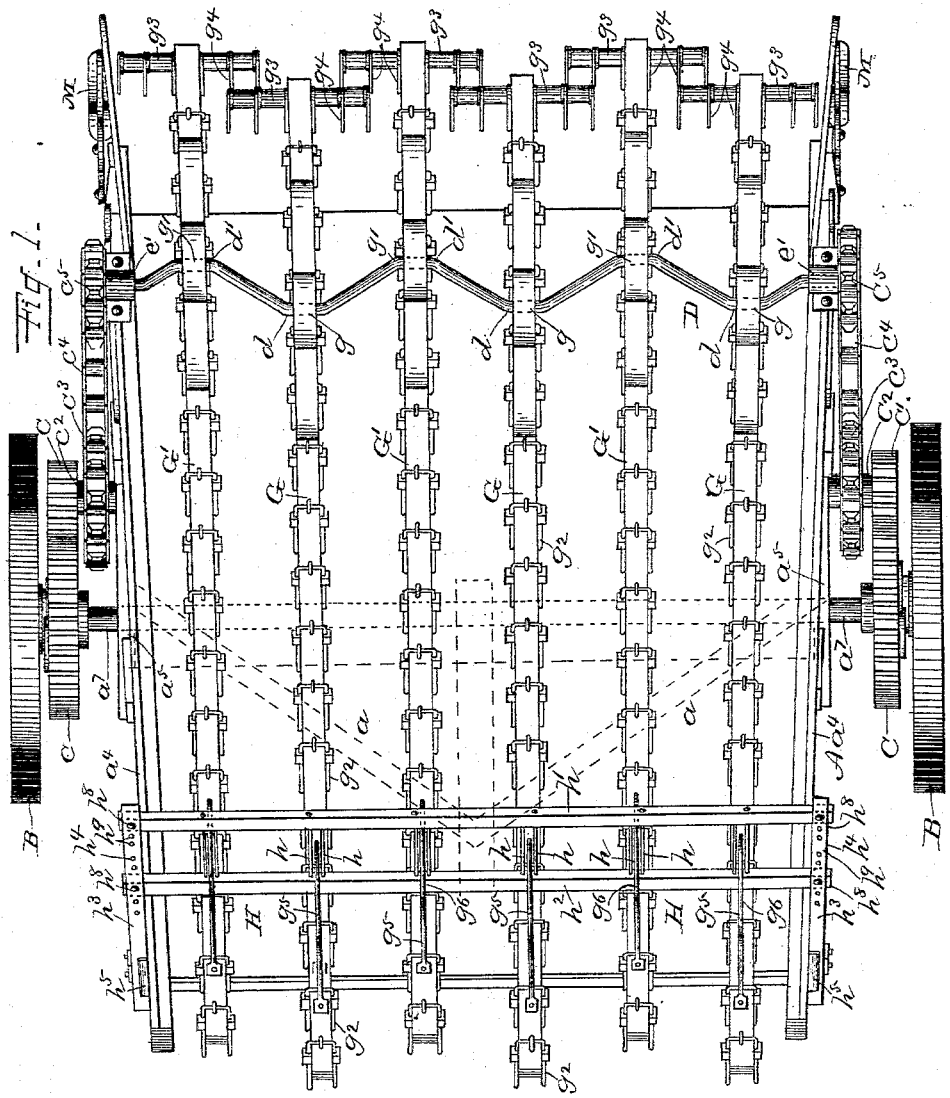

(No Model.) 3 Sheets—Sheet 1.

C. E. WHITE & C. P. A. FRIBERG.
HAY RAKE AND LOADER.

No. 533,514. Patented Feb. 5, 1895.

Witnesses:
L. R. Richards.
G. W. Sanders.

Inventors:
Charles E. White
Charles P. A. Friberg,
By W. B. Richards,
their Atty.

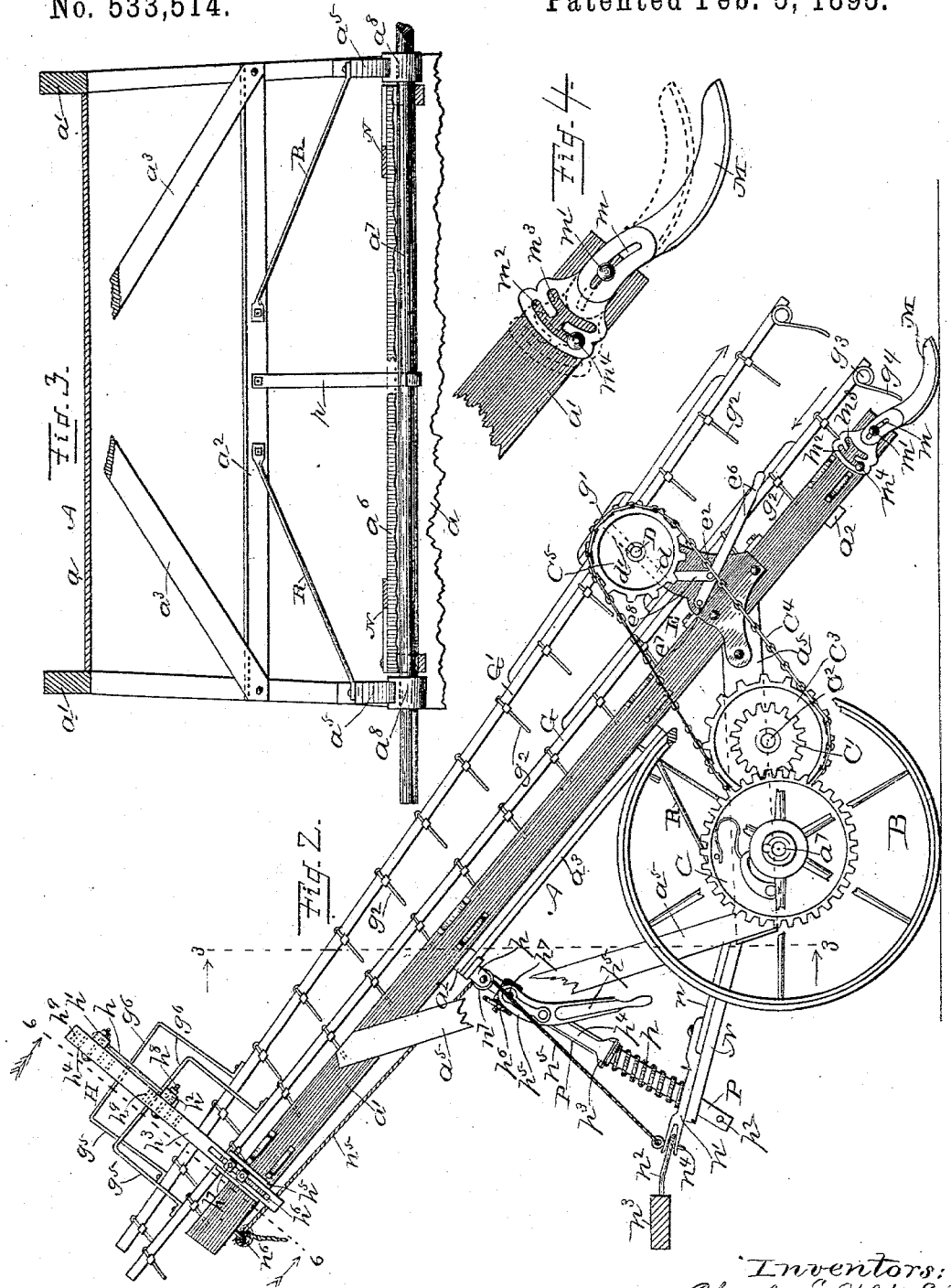

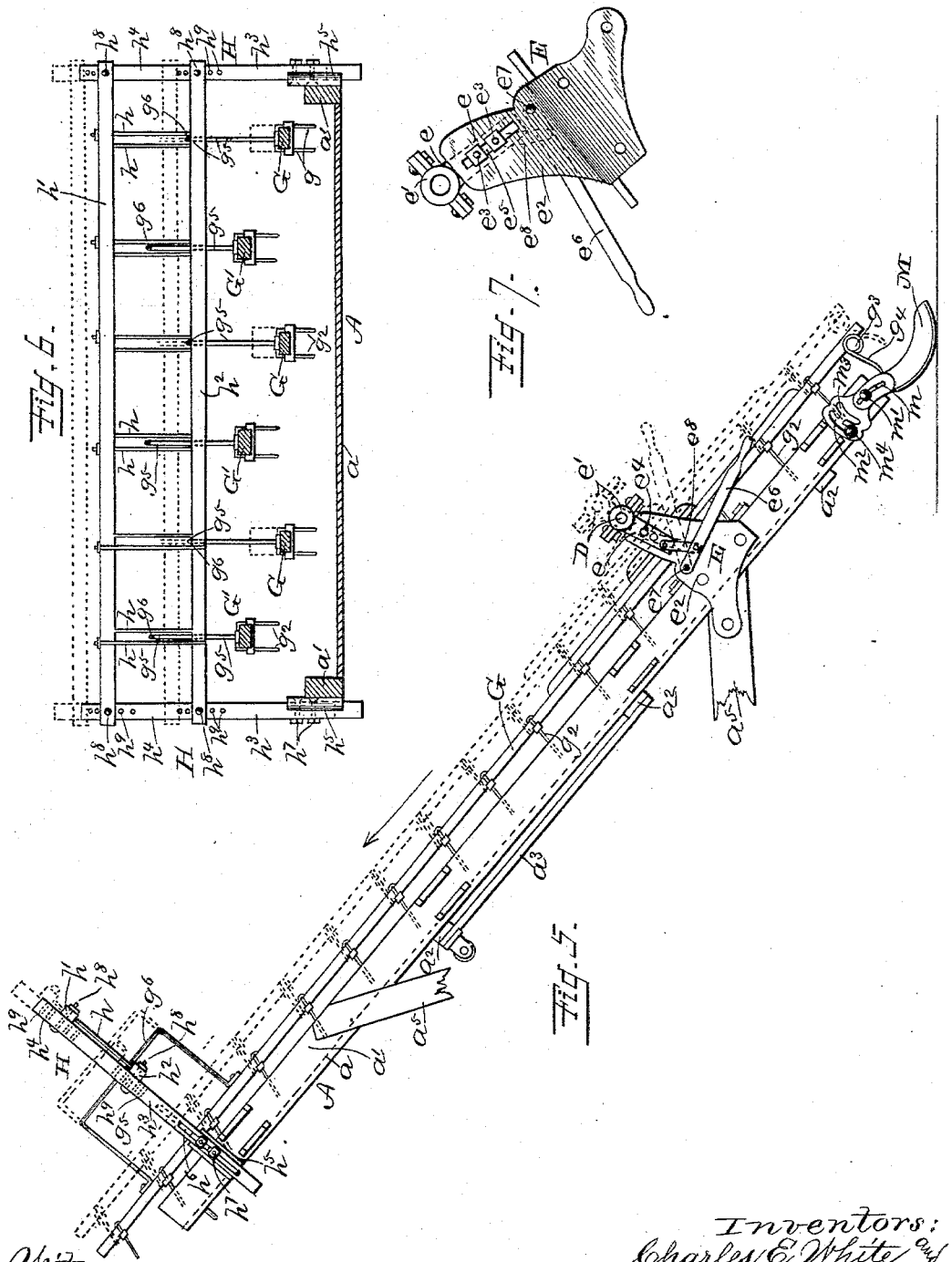

UNITED STATES PATENT OFFICE.

CHARLES E. WHITE AND CHARLES P. A. FRIBERG, OF MOLINE, ILLINOIS, ASSIGNORS TO THE DEERE & MANSUR COMPANY, OF SAME PLACE.

HAY RAKE AND LOADER.

SPECIFICATION forming part of Letters Patent No. 533,514, dated February 5, 1895.

Application filed January 6, 1893. Serial No. 457,457. (No model.)

*To all whom it may concern:*

Be it known that we, CHARLES E. WHITE and CHARLES P. A. FRIBERG, citizens of the United States, residing at Moline, in the county of Rock Island and State of Illinois, have invented certain new and useful Improvements in Hay Rakes and Loaders, of which the following is a specification.

This invention pertains to hay rakes and loaders of that general class in which the hay is impelled or forced upwardly over an inclined platform by alternately reciprocating gangs of rake bars, which are provided with teeth for that purpose and also with teeth for raking and collecting the hay, and drawing it onto the inclined platform and are operated by a multicrank shaft, or crank shaft with the cranks so disposed as to give simultaneous endlong movement to all of the rake bars of each gang of such rake bars, alternately with reference to the simultaneous endlong movements of the rake bars of its fellow gang or gangs.

In our experience, in that particular type of this general class of hay rakes and loaders, in which particular type simultaneous endlong movement is given to the rake bars comprising each gang, alternately with the simultaneous movement of the rake bars comprising its fellow gang or gangs, while all of the rake bars of both gangs have rising and falling movements independent of each other at their upper ends, and in which means are provided for controlling the movements of the rake bars by permitting them on their return movements to rise independently and sufficiently at their upper ends to clear the returning teeth from the advancing hay, and by limiting the approach of the rake teeth, at the upper ends of the rake bars, to the bed of the inclined platform, we have found it very desirable in raking and loading lighter and heavier crops of hay, to have means for controlling or adjusting the nearness of the approach of the independently rising and falling rake teeth to the bed of the platform, and thereby have means for increasing or diminishing the capacity of the delivery opening or throat between the bed of the platform and the rake teeth when at their lowest positions or nearest said platform bed; and to this end our invention consists in the combination with the platform and rake bars which have independent rising and falling movements at their upper ends, of a frame adjustably mounted on the upper end of the spout or platform, and provided with guards to limit the movement of the upper end of the rake bars toward the platform bed, which guard carrying frame can be adjusted and fixed in a lower or higher position with reference to the platform, for the purpose of causing the rake teeth to move in the lower part of their paths nearer to the upper end of the platform or to move in paths farther therefrom as may be found desirable to facilitate the passage of hay from the swath or from windrows, when more or less abundant on the ground, or when in different conditions.

A further object of our invention and pertaining to the same particular type of hay rake and loader hereinbefore referred to, is to adjust the distance between the multicrank-shaft and the bed of the platform, as may be found necessary to adjust the rake bars at their lower ends, when their independently rising and falling upper ends are adjusted to operate nearer to or farther from the bed of the platform; to which end and object our invention consists, in combining with our adjustment of the approach of the independently rising and falling upper ends of the rake bars to the platform bed, an adjustment of the standards in which the multicrank shaft is journaled.

A further object of our invention is to provide means, in combination with our means for adjusting the limit of descent of the upper ends of the independently raising and falling rake-bars, and in combination with our adjustable multi-crank-carrying standards, for adjusting the lower end of the inclined platform, in order to adjust the rake teeth to act properly on the hay on the ground, when the multicrank-shaft is adjusted to operate at different heights above the platform bed; to which end our invention consists in the use and in the combinations referred to of adjustable shoes, for raising and lowering the lower end of the platform and thereby raising and lowering the path of the rakes which collect the hay, in the lowest part of their orbital movements.

A still further object of our invention is to stiffen and stay, without objectionable weight, the axle used in this general class of hay rakes and loaders, and to this end our invention consists in a support for the platform and operating parts mounted thereon, consisting of brace bars resting with their lower ends near the wheel hubs, at the ends of the axle, and a pendant from the platform adapted to support the central part of the axle.

The novel means employed in carrying out the objects of our invention, are hereinafter described, and made the subject matter of the claims hereto appended.

The preferred construction of parts of our improvements and arrangement thereof, and the adjacent parts of a machine in which the improvements are incorporated are illustrated in the accompanying drawings, in which—

Figure 1 is a top plan of a hay rake and loader embodying our improvements as viewed from an indefinite distance vertically above the machine, as standing at Fig. 2; Fig. 2, a side elevation, partly broken away, to show other parts; Fig. 3, an elevation of the means for supporting the axle, and sectional elevation of the platform or spout, in the line 3, 3, in Fig. 2, and viewed at right angles to said line, 3, 3; Fig. 4, an enlarged side elevation of the lower end of the platform, and the adjustable shoe; Fig. 5, a side elevation of the platform or spout, one rake bar, and the adjusting mechanism, at the upper and lower ends of the platform, and at the multicrank shaft; Fig. 6, a sectional elevation, in the line 6, 6, in Fig. 2, viewed at right angles to said line; Fig. 7, a side elevation of the opposite side of the adjustable standard, to the side thereof shown at Figs. 2 and 5.

In order to describe and explain fully and clearly the nature and operation of our improvements, we have hereinafter described the nature and operation of an ordinary construction of hay rake and loader, embodying certain novel features aside from our improvements, in which machine our improvements are incorporated, and in such descriptions have pointed out in what features our improvements consist, and also pointed out the other novel features referred to, and which are not claimed as of our invention.

The platform or spout A is of ordinary construction, having a bed or bottom part $a$, side beams $a'$, transverse frame bars $a^2$, braces $a^3$, and side boards $a^4$, supported by side frame bars $a^5$ which are journaled or fulcrumed on the axle $a^7$ near the ends thereof, by bearings $a^8$ to permit of the axles rotating therein and of swinging or oscillating the platform in a vertical plane on the axle as a fulcrum, the outer ends of the axle being supported on the wheels B, which are journaled thereon. Each wheel B is adapted in an ordinary manner to rotate the axle when the machine is moved forwardly and to not rotate it when the wheel is turned in an opposite direction, by means of a click and pawl gear between each wheel B and pinion C, one of which pinions is fixed to the axle adjacent to each wheel B. The pinions C each gear with an adjacent pinion $c'$, fixed to a shaft $c^2$ to which is fixed a sprocket wheel $c^3$, which is geared by a sprocket chain $c^4$ with a sprocket wheel $c^5$. One of the sprocket wheels $c^5$, is fixed to each end of the multicrank shaft D, which is formed into two sets of cranks $d$ and $d'$, which are so disposed that the cranks $d$ all project in the same radial plane from the axial line of the shaft, and all of the cranks $d'$ in the same radial plane, but in diametrically opposite directions from the axial line of the shaft. The multicrank shaft D is journaled in standards E, which are fixed one to each side of the platform A.

As a feature of our improvement, the standards E are adjustable in length for purposes hereinafter described, as follows: The upper part or end $e$ of each standard E is provided with the bearing boxes $e'$ for the multicrank shaft D, and is adjustable on the lower part or end $e^2$, which is fixed to the platform A, and can be fixed after such adjustments by means of nutted bolts $e^3$ which pass through holes $e^4$ in the part $e$ and a slot $e^5$ in the part or end $e^2$. To facilitate making these adjustments of heavy parts, we provide a hand lever $e^6$, fulcrumed at $e^7$ on the lower part $e^2$ of the standard, and pivotally connected by a link rod $e^8$ with the upper part $e$. By first loosening the nuts on the bolts $e^3$, the upper parts $e$ of the standards can be raised and lowered, as desired to adjust the multicrank shaft in higher or lower positions with reference to the platform bed.

The rake bars G of one gang thereof are hinged at $g$ to the cranks $d$, and the bars G' of the other gang are hinged at $g'$ to the cranks $d'$. All of the rake bars are provided with teeth $g^2$ for impelling the hay upwardly of the platform bed, and rake heads $g^3$ with teeth $g^4$ for collecting the hay and drawing it onto the platform bed.

To the upper ends of the rake bars are fixed staple-shaped guide rods $g^5$, the upper parts $g^6$ of which are each parallel, or approximately so, with the rake bar to which it is fixed. The guide rods $g^5$ pass between guard rods $h$ which are arranged in pairs for that purpose, see Fig. 6, and are fixed at their upper ends to a bar $h'$, and at their lower ends to a guide bar $h^2$, both of which bars $h'$, $h^2$, extend across the platform A, and are fixed to standards $h^3$ to form a frame H. The guide rods $g^5$ serve to align the movements of the rake bars, or to prevent lateral deflection in the movements thereof, and the bar $h^2$ serves to limit the approach of the rake teeth to the platform bed by means of the parts $g^6$ of the guide rods coming in contact therewith and sliding thereover.

As a feature of our invention the bar $h^2$ is made adjustable to and from the platform bed for the purpose of limiting and regulating the nearness with which the rake teeth on the independently rising and falling rake bars can approach the platform bed at its upper portion.

The adjustment referred to of the bar $h^2$, is preferably effected by adjustments of the standards $h^3$. One method of effecting said adjustment is, as shown, by using a standard in two parts, an upper part $h^4$, and lower part $h^5$, the upper part seated in ways in the lower part, and provided with a slot $h^6$ through which nutted bolts $h^7$ pass, which also pass through the part $h^5$. The frame H may thus be adjusted to bring the bar $h^2$ nearer to or farther from the platform bed, and fixed after such adjustments by the bolts $h^7$. If preferred the bar $h^2$ may be adjusted for the same purpose, by raising or lowering it as desired on the standards $h^3$ as shown, and fixing them after such adjustments by bolts $h^8$ which pass through the bar $h^2$, and through either of a series of holes $h^9$ in the standards $h^3$.

It will be evident to any person skilled in the art that other means than we have herein shown may be used to limit, adjust and control the approach of the upper ends of the rake bars to the platform bed, when such rake bars are disconnected at their upper ends and have rising and falling movements independently of each other, and hence we do not limit our claims in connection with this feature to the particular means shown and described for regulating and controlling the nearness to which the rake teeth may approach the platform bed at the upper end of the rake bars.

As another feature of our invention, shoes, or runner shaped supports M, are fixed to the lower end of the platform A in such manner that they can be adjusted to raise and lower that end of the platform, and thereby adjust the rakes at the lower ends of the rake bars at proper or desired distances from the ground as they sweep through the lowermost parts of their orbital movements, and as may be required after adjustments of either the frame H, or the standards E, or both of them. This adjustment of the shoes M is preferably effected as follows: Each shoe or runner M has a slot $m$ through which a pivotal bolt $m'$ passes into the side frame bar $a'$ of the platform A, and has communicating slots $m^2$, $m^3$, through which another bolt $m^4$ passes into the same frame bar. By loosening the bolts $m'$, $m^4$ the shoe may be adjusted to raise or lower the lower end of the platform A, and rake bars, as indicated by dotted lines at Fig. 4, and the parts may be fixed after such adjustments by again tightening up said bolts. By sliding the slot $m$ on the bolt $m'$ the slot $m^3$ may be brought into engagement with the bolt $m^4$, and the extent of adjustment of the shoe thereby be much increased, with a corresponding increase of adjustment of the lower end of the rake bars.

A draft bar N and hounds $n$ project from a bar $a^6$ which is journaled on the axle, and carry at their forward ends a clevis bar $n'$ which is forked at its forward end to receive a bracket or bar $n^2$ which projects rearwardly from a part $n^3$ of a wagon or hay rack to which the machine is to be attached. A pin $n^4$ couples the bars $n'$ and $n^2$ to each other. We have shown the pin $n^4$ with an eye at its upper end for the attachment thereto of a cord $n^5$ which extends upwardly over pulleys $n^6$, $n^7$, suspended from the lower side of the platform bed $a$, the upper pulley $n^6$ being near the upper end of the platform so that the driver or person on the load of hay may when the rack is loaded pull on the cord $n^5$ and withdraw the pin $n^4$ from the bars $n'$, $n^2$ and thus uncouple the rake and loader from the hay wagon without dismounting from the load of hay. We do not make any claim herein to this manner of releasing the rake and loader from a wagon it has been used to load with hay, as such improvement is shown, described and claimed in an application of Charles E. White, filed January 7, 1893, Serial No. 457,701.

A bar P pivoted at its upper end to a short standard $p$ which is pendent from the bottom or bed of the elevator, extends downwardly through a hole in the front end of the draft bar N. As in common use a spiral spring $p'$ encircles this bar P between the draft bar N and a fixed stop on the bar P, which spring yields when the rakes or the shoes on the lower end of the platform pass over obstacles or elevated places on uneven surfaces, and thus relieves the rakes, eases the movements of the platform, and by its resiliency restores the platform and rakes again to their normal positions. A pin $p^2$ in the lower end of the bar P prevents its withdrawal from the bar N. As shown in the drawings herewith, the stop at the top of the spring $p'$ is a sliding head $p^3$ with a large opening for the bar P, and an extended upper end $p^4$ which is pivotally connected with a hand lever $p^5$, a short distance from where said hand lever is fulcrumed at $p^7$, at its end to a block $p^6$ which is adjustable on the bar P. In the position shown at Fig. 2 the parts of the hand lever and link rod $p^4$ are in line to lock the sliding head $p^3$ in place as for operation in the field. The block $p^6$ may be adjusted in higher or lower positions on the bar P and locked after such adjustments, for increasing or diminishing the tension of the spring as desired or required.

When connecting the draft bar N with a wagon as hereinbefore described, the hand lever $p^5$ can be thrown upwardly at its outer end, the head $p^3$ swinging for that purpose, to release the spring and remove all tension therefrom, so that it will offer no resistance to raising and lowering the end of the draft bar for the purpose of engaging it with the arm $n^2$.

We do not claim herein the means shown and described for readily and quickly removing the tension from the spring $p'$, as such improvement is shown, described and claimed in the pending application of Charles E. White hereinbefore referred to. Nor do we claim the means for attaching the teeth $g^2$ to the rake bars shown in the accompanying drawings, as such improvement is, we believe, the invention of Charles P. A. Friberg.

Braces R (see Fig. 3) extend from near the central part of the transverse bar $a^2$, one to that end of each bar $a^5$ which rests on the axle. These braces support the central part of the bar $a^2$ from which a pendant $r$ extends down to the axle, and the lower end of which partly encircles the axle, so as to sustain and steady it at its midlength portion, while not interfering with its rotations.

The action of the multicrank shaft with its two sets of cranks disposed in diametrically opposite directions from the axis of said crank shaft, in giving alternate motions in regular sequence to the rake bars is well known, and need not be herein further described.

At Fig. 2 a rake bar of each gang G and G' is shown, the rake bar G being shown as when impelling hay up the platform bed, and with the part $g^6$ of its guide rod $g^5$ on the bar $h^2$ which thus limits the teeth at the upper end of the rake bar in their descent toward the platform bed $a$, and at the same time permits either rake bar to rise from, and fall again to, the same limit, independently of the other rake bars; and which limiting bar $h^2$ is adjustable to adjust the limit of approach of the teeth at the upper ends of the rake bars, and thus provide means for adjusting this limit of descent of the rake bars, and at the same time not interfere with their rising and falling independently of each other. The rake bar G' at same figure is shown in its elevated position, and as making its backward movement, its upper end being elevated by the teeth $g^2$ as they are withdrawn from the hay. The teeth $g^2$ at the lower ends of the rake bars are but little inclined, as they are lifted nearly vertically out of the hay by the multicrank shaft, but as the upper ends of the rake bars are approached these teeth are more inclined to the rake bar, to facilitate their removal from the hay by the backward endlong, and slightly rising movement of that end of the rake bars.

At Fig. 5, a rake bar G is shown as moving upwardly of the platform, to impel hay in the same direction. The full lines at this figure show the rake bar with its teeth $g^2$ operating within a short distance of the platform, the adjustments having been made of the frame H, and standards E, for that purpose, as hereinbefore described, and as shown also by full lines at same figure. The dotted lines at same figure show the rake bar with its teeth $g^2$ operating at an increased distance from the bed of the platform, the adjustments having been made of the frame H, and standards E, for that purpose, and when the rake bars are thus adjusted, and the rake teeth $g^4$ thereby elevated with reference to the ground, by adjustments of the shoes M in an evident manner the teeth $g^4$ can be made to sweep in lower or higher paths to suit such adjustments.

It is sometimes desirable to adjust the bar $h^2$ in higher or lower positions without adjusting the standards E, and in such adjustments the upper ends of the rake bars are caused to operate farther from or nearer to the platform bed, and pivoting on the multicrank shaft, the lower ends of the rake bars and teeth $g^4$ will be lowered when the bar $h^2$ is raised, and raised when the bar $h^2$ is lowered; and when such adjustments are made, or when the standards E are adjusted to carry the multicrank shaft near to or farther from the platform bed without adjusting the bar $h^2$, then the shoes M can be adjusted, in an evident manner to raise and lower the lower end of the platform and thereby cause the teeth $g^4$ to operate at proper distances from the ground.

Other advantages arising from the adjustment of the rake bars having independently rising and falling movements of their upper ends, to adjust their lowermost sweep in their paths of movement, at their upper ends, at the multicrank shaft, and at their lower ends, as provided for by our invention, and in the use of said adjustments separately and in combination we consider evident, and as not requiring further description herein.

Having thus described our invention, what we claim as new, and desire to secure by Letters Patent, is—

1. In a hay rake and loader, the combination of the inclined platform or underlying frame, and the reciprocating rake bars provided with means for adjusting, limiting, or controlling the approach of the rake bars, at their upper ends, to the inclined platform or underlying frame.

2. In a hay rake and loader, the combination substantially as hereinbefore described, with an inclined platform, multicrank shaft, and rake bars having teeth for impelling hay upwardly of the inclined platform, and raking teeth for collecting the hay and delivering it onto said platform, and which rake bars have rising and falling movements independently of each other at their upper ends, of means for adjusting, limiting, or controlling the approach of the teeth, at the upper ends of the rake bars, to the bed of said platform.

3. In a hay rake and loader, the combination substantially as hereinbefore described, with an inclined platform, multicrank shaft, and rake bars having teeth for impelling hay upwardly of the inclined platform, raking teeth for collecting hay and delivering it onto said platform, and guide rods, and which rake bars have rising and falling movements independently of each other at their upper ends, of an adjustable bar or stop for limiting or controlling the approach of the teeth at the upper ends of the rake bars to the bed of said platform.

4. In a hay rake and loader, the combination substantially as hereinbefore described, with an inclined platform, multicrank shaft, and rake bars having teeth for impelling hay upwardly of the inclined platform, raking teeth for collecting hay and delivering it on to said platform, and guide rods, and which rake bars have rising and falling movements independently of each other at their upper ends, of a frame supported by adjustable standards on the platform, and provided with a bar or stop for controlling the approach of the teeth at the upper ends of the rake bars to the bed of said platform.

5. In a hay rake and loader, the combination substantially as hereinbefore described, with an inclined platform, multicrank shaft, and rake bars having teeth for impelling hay upwardly of the inclined platform and raking teeth for collecting the hay and delivering it on to said platform and staple shaped guide rods $g^5$, and which rake bars have rising and falling movements independently of each other at their upper ends, of a frame supported on said platform by adjustable standards and provided with bars $h'$, $h^2$, which support the guard rods $h$, and the bar $h^2$ of which is adapted to limit the downward movement of the rake bars.

6. In a hay rake and loader, the combination, substantially as hereinbefore described, with an inclined platform, multicrank shaft, and rake bars having teeth for impelling the hay upwardly of the inclined platform, and raking teeth for collecting the hay and delivering it on to said platform, and which rake bars have rising and falling movements independently of each other at their upper ends, and an adjustable frame having a bar or stop for limiting, or adjusting the downward movement of the rake bars at their upper ends, of adjustable standards, for raising and lowering the multi-crank shaft, to thereby adjust the lower ends of the rake bars to operate at different distances from the platform.

7. In a hay rake and loader, the combination substantially as hereinbefore described, with an inclined platform, multicrank shaft, and rake bars having teeth for impelling the hay upwardly of the platform, and raking teeth for collecting the hay and delivering it on to said platform, and which rake bars have rising and falling movements independently of each other at their upper ends, and a frame as H adjustably fixed to the platform, and provided with bars $h'$, $h^2$, and guard rods $h$, of standards E, in two parts, one part of which is fixed to the platform, and the other part of which is adjustable thereon.

8. In a hay rake and loader, in combination with the inclined platform, the rake bars, having rising and falling movements at their upper ends independently of each other, means for adjusting the rake bars in their approach to the upper end of the platform, and adjustable standards carrying the multicrank shaft, the shoes M adjustably fixed to the lower end of the platform, substantially as described.

9. In a hay rake and loader, in combination with the inclined platform, the rake bars having staple shaped rods $g^5$, and rising and falling motions at their upper ends independently of each other, the adjustable frame H, having bars $h'$, $h^2$, and rods $h$, and the adjustable standards E carrying the multicrank shaft, the shoes M adjustably fixed to the lower end of the platform, substantially as described.

10. In a hay rake and loader, in combination with the inclined platform, the rake bars, having rising and falling movements at their upper ends, means for adjusting the rake bars in their approach to the upper end of the platform, and adjustable standards carrying the multicrank shaft, the shoes M adjustably fixed to the lower end of the platform, substantially as described.

11. In a hay rake and loader of the class hereinbefore described, and in combination with the inclined platform, the multicrank shaft and the rake bars operated thereby, the shoes M, having a slot $m$ for the pivot bolt $m'$, and the connected or communicating slots $m^2$, $m^3$, for the fixing bolt $m^4$, substantially as described.

12. In a hay rake and loader of the class hereinbefore described, and in combination with the inclined platform, the multicrank shaft and the rake bars operated thereby, and the braces R, the pendant $r$ fixed at its upper end to the platform, and hook shaped at its lower end to engage with and support the central part of the axle $a^7$, substantially as described.

13. In a hay rake and loader the combination with an inclined platform, rake bars, multicrank shaft for operating said rake bars, and means for adjusting the upper ends of the rake bars to operate nearer to or farther from the bed of said platform, of adjustable shoes at the lower ends of the platform.

14. In a hay rake and loader, the combination with the inclined platform, the rake bars, multicrank shaft for operating the rake bars, means for adjusting the upper ends of the rake bars to operate nearer to or farther from the bed of said platform, adjustable standards carrying the multicrank shaft, and adjustable shoes at the lower end of said platform.

In testimony whereof we affix our signatures in presence of two witnesses.

CHARLES E. WHITE.
CHARLES P. A. FRIBERG.

Witnesses:
W. J. ENTRIKIN,
J. A. ENTRIKIN.